April 27, 1971    W. ANGELE ET AL    3,576,723

METHOD OF MAKING SHIELDED FLAT CABLE

Filed April 23, 1968    4 Sheets-Sheet 2

BOBBY W. KENNEDY
WILHELM ANGELE
*INVENTOR.(S)*

*ATTORNEYS*

United States Patent Office 3,576,723
Patented Apr. 27, 1971

3,576,723
METHOD OF MAKING SHIELDED FLAT CABLE
Wilhelm Angele, Huntsville, and Bobby W. Kennedy, Arab, Ala., assignors to the United States of America as represented by the Administrator of the National Aeronautics and Space Administration
Filed Apr. 23, 1968, Ser. No. 723,488
Int. Cl. C23b 5/64
U.S. Cl. 204—30                7 Claims

ABSTRACT OF THE DISCLOSURE

A flat conductor cable having multiple ribbon-like conductors in spaced, parallel arrangement in a flat strip of insulating material is coated with a layer of shielding metal such as copper by roughening the surface of the insulating strip, contacting the strip with an electroless plating bath and then with an electrolytic plating bath. Contact of the metal shield with a ground conductor is obtained by exposing a portion of one or more conductors along the length of the cable prior to plating. An outer layer of insulating material is applied over the shielding layer.

---

The invention described herein was made by employees of the United States Government and may be manufactured and used by or for the Government for governmental purposes without the payment of any royalties thereon or therefor.

BACKGROUND OF THE INVENTION

This invention relates to flat conductor cables and more particularly to shielded flat cables.

Flat conductor cables developed within the past decade offer significant advantages over conventional round cables for many applications. Flat cables, which have multiple ribbon-like conductors disposed in parallel, spaced arrangement within a strip of insulating material, are usually made by laminating the conductors between thin, flexible insulating films. The resulting cable structure is more flexible than round cable and it is thus advantageous for use as an interconnecting medium between components which move in relation to one another. Flat cable also provides weight and space savings made possible by thinner insulation with dielectrics of higher mechanical and electrical strength. In addition, the more efficient heat dissipation shown by flat cables enables higher currents to be carried per equal conductor cross section.

For some applications shielding of flat cable is required. Cable connecting sensitive electronic components operating in proximity to equipment which produces radio frequency energy or electrical noise must be surrounded with a protective metal sheath or shield to avoid transmission of spurious signals or "spikes." If necessary, the shield may be connected with a ground conductor along the length of the cable to assure proper grounding of any interfering currents.

Shielded flat cable has been made previously by laminating screen wire or perforated metal foil to one or both sides of the cable, with an outer layer of insulating material being applied to the shielding layer. Connection of the shield to a ground conductor in such shielded cable has been obtained by exposing the flat surface of one or more of the conductors so that the shield is pressed against the conductor during lamination. This approach, however, has presented serious problems. In order to obtain continuous and reliable contact between the shield and ground conductor an adhesive is needed. If no adhesive is present between these components, contact is made only from the pressure applied during lamination, the pressure being released after lamination. Contact between the shield and ground conductor will often be incomplete and unreliable. In addition the area having no adhesion may retain small air pockets which promote corrosion and delamination, especially at high temperature and in vacuum. Where an adhesive is applied between the shield and ground conductor the adhesive acts as an insulator and interferes with grounding. In addition, the flexibility of shielded flat cables has often been less than desired, particularly for connections between delicately balanced parts which moves in relation to one another, and foil-type shields often develop wrinkles and fractures when flexed.

SUMMARY OF THE INVENTION

In the present invention flat conductor cable having multiple flat conductors disposed in spaced, parallel arrangement in a flat strip of insulating material is shielded by a metal layer applied by electroless and electrolytic plating. Continuous and reliable contact between the shielding layer and a ground conductor is obtained by exposing a portion of the surface of the conductor along the length of the cable. An outer layer of insulating material can be applied over the shielding layer by lamination. Shielded cable prepared by this method is highly flexible since only a very thin layer of electroless and electrolytically applied plating is required for effective shielding.

It is therefore an object of this invention to provide an improved electrically and magnetically shielded flat conductor cable.

Another object is to provide a shielded flat conductor cable having continuous and reliable electrical contact between the shield and a ground conductor along the length of the cable.

Another object is to provide a method of making shielded flat conductor cable.

Another object is to provide a method of applying a layer of shielding metal to the outer surface of insulation material in which electrical conductors are embedded.

BRIEF DESCRIPTION OF THE DRAWINGS

Other objects and advantages of the invention will be apparent from the following detailed description wherein reference is made to the accompanying drawings in which like reference characters indicate the same or similar parts in the various views.

In the drawings.

DESCRIPTION OF THE PREFERRED EMBODIMENT

Figure 1:
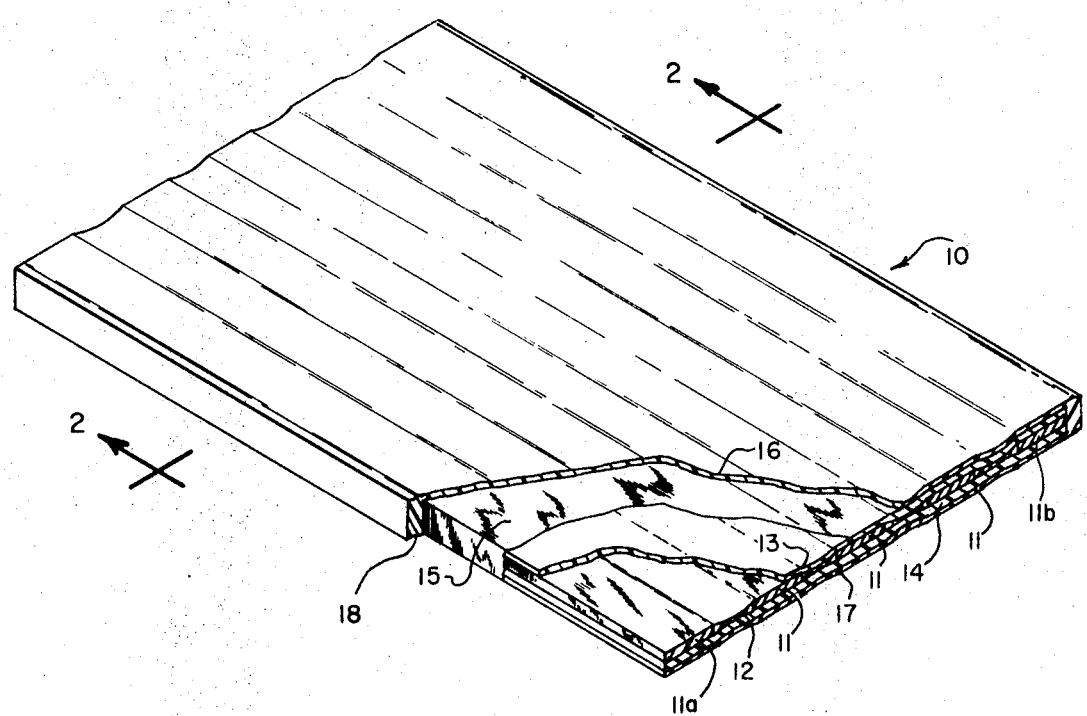
FIG. 1 is an isometric, sectional view, partially broken away, of a shielded flat cable having the shield in contact with the outermost conductor edge.
Figure 2:
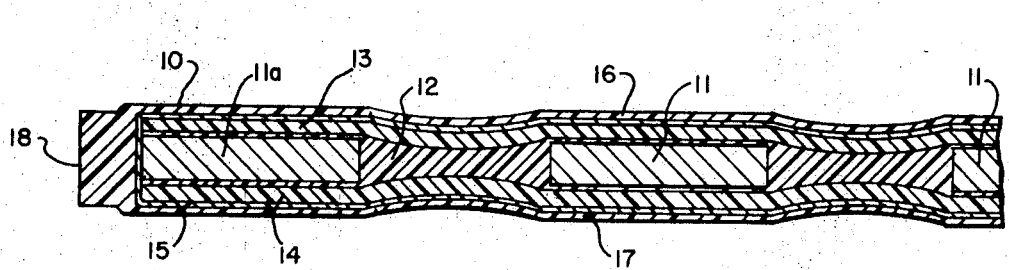
FIG. 2 is a fragmentary sectional view taken along a portion of line 2—2 of FIG. 1.

Referring to FIG. 1 and FIG. 2 in the drawings, a multilayer shielded flat cable is generally designated as 10. The cable 10 includes a plurality of flat conductors 11 of an electrically conductive metal arranged in spaced, edge-to-edge, parallel relationship and separated by adhesive 12 which has insulating qualities. The conductors 11 are encased by top and bottom layers 13 and 14, respectively, of insulating material. A layer of shielding metal 15, applied by electroless and electrolytic plating as described below, surrounds the insulation-encased flat-conductor layer, the outermost conductors 11a and 11b being in contact with the shielding layer 15 at their outer edges as a result of these edges having been exposed prior to plating. The shielding layer is in turn encased by top and bottom outer layers 16 and 17, respectively, of insulating material.

The flat conductors 11 can be made of any electrically conductive metal such as copper. The number of conductors, the width and thickness thereof and the spacing between conductors can be varied widely, depending on the requirements for the particular cable. Although the invention is not to be understood as so limited, most conductor cables for which shielding is required will employ conductors from 0.040 to 0.075 inch in width and from 0.003 to 0.005 inch in thickness, with a spacing between conductors from 0.010 to 0.050 inch. Larger cables can also be provided with a shield in accordance with this invention. The cable can be made as wide as necessary to accommodate the desired number of conductors.

The conductors 11 are separated by and encased in insulating material. In the embodiments shown in FIG. 1 through FIG. 5 a portion of the insulating material is an adhesive, which occupies most of the space between conductors and which is present as a thin film on the flat surface of the conductors. Where the flat cable is made by lamination, an adhesive is used to ensure good bonding, and the adhesive is forced into the space between conductors. Any adhesive having a low dielectric constant and the capability for bonding the insulation film material to itself and to the conductors can be used. A copolymer of tetrafluoroethylene and hexafluoropropylene, available commercially as film adhesive under the designation "Teflon FEP" is preferred, and other adhesives which can be used include polytetrafluoroethylene, polyimides such as poly[N - (4,4' - diphenylether)4,4' - carbonyldiphthalimide], epoxies, polyesters and the like. The bulk of the insulating material surrounding the conductors is provided by sheets of insulating film which make up layers 13 and 14. The insulating film can be any material having a sufficiently low dielectric constant for the particular cable requirement, and plastics such as polyethylene terephthalate (Mylar), polyimides exemplified by "Kapton," and halogenated hydrocarbons exemplified by Teflon FEP and polytetrafluoroethylene are preferred for their favorable mechanical and thermal properties, consistent with good insulating qualities. Other plastic insulation materials such as silicones, polyethylene and polyvinylchloride can also be used. In some cases, and particularly for silicones, polyethylene and polyvinylchloride, a suitable primer must be used to ensure adhesion. The insulating film is provided at a thickness suitable for the particular cable requirements, a thickness of 0.001 to 0.005 inch being suitable in most cases.

The unshielded cable having the conductors embedded in insulating material can be prepared by previously known methods such as a lamination process wherein the conductors and the top and bottom insulating films are fed from spools through a heated roller, the insulating films having applied to the mating surfaces thereof an adhesive of the type described above. Other methods such as extrusion or etching a copper sheet bonded to an insulating film to produce separated conductors, followed by lamination with a covering film of insulation material can also be used.

The composition of the shielding layer 15 is selected to provide the desired shielding characteristics and capability for application by plating. For shielding from high frequency energy, that is, from one kilocycle per second to one megacycle per second and higher, copper is preferred because of its effectiveness and ease of application by plating. At lower frequencies or for shielding from electromagnetic interference copper is less effective, and nickel, iron and chromium are preferred. In some cases the shielding layer can be made up of two metals, an initial coating of copper applied by electroless coating and a coating of a second metal such as nickel over the copper by electrolytic plating. The latter approach is used where the metal desired for its shielding characteristics cannot be readily applied by electroless plating. Only a very thin shielding layer is required for effective shielding, a thickness of 0.0001 to 0.0005 inch being suitable in most cases. Thicker layers can be applied by depositing greater amounts of metal in the plating steps, but at the expense of greater weight and decreased flexibility.

Where contact between the shielding layer and one or more ground conductors is desired, a portion of the surface of the conductor is exposed along the length of the cable prior to plating. This result is readily obtained by slitting or cutting the insulation away from the edge of one or both of the outermost conductors. The contact obtained by exposing only the thin edge of the conductor is highly effective and reliable. Conductors other than those at the edges of the cable could also be exposed and employed for grounding if desired.

In order to produce a suitable bond between the insulating layers 13 and 14 and the shielding metal 15 the outer surfaces of the insulating layers are subjected to a surface roughening or etching treatment. The surface area of the insulating material in contact with the electroless plating bath is increased greatly by this means to provide effective adhesion of the metal deposited by electroless plating. This treatment is carried out by contacting the insulating film with an etchant selected for its reaction with the particular film material, the film having first been cleaned and degreased by conventional methods. Suitable etchants for the preferred film materials are as follows: "Teflon FEP," a sodium aryl solution containing butyl alcohol and available commercially as "Gore Tetraetch"; Kapton, an aqueous solution of sodium hydroxide having a normality of 15 to 20; Mylar, an aqueous phosphoric acid solution having a concentration of 80 to 85 percent. The reaction conditions in the surface treatment step should be controlled carefully to avoid excessive dissolution or penetration of the film. The surface roughening treatment can be carried out by passing the cable through a tank containing the appropriate etchant. A contact time of 2 to 3 minutes is sufficient for this step in most cases. Smooth deposition of the electroless plating is enhanced by contacting the roughened cable with a wetting agent solution such as an aqueous solution containing 5 percent each of stannous chloride and palladium chloride prior to plating.

The metal shielding layer 15 is applied to the rough-surfaced flat cable by a two-step procedure including electroless and electrolytic plating. Electroless plating is used to deposit a very thin conductive layer on the cable so that a current can be applied to the surface in the electrolytic plating step, the bulk of the shielding layer being deposited by electrolytic plating.

Electroless plating is carried out by contacting the insulated cable with an electroless plating bath. Owing to its ease of application and effectiveness of the plating in the subsequent electrolytic plating, copper is the preferred electroless plating metal. Previously known electroless copper plating baths can be used, an example of a suitable bath composition in grams per liter of water, being as follows: copper sulfate, 29; sodium carbonate, 25; Rochelle salt, 140; "Versene-T" (sodium salt of ethylenediaminetetraacetic acid), 17; sodium hydroxide, 40; and formaldehyde (37% solution), 150. For a bath of this composition, the operating temperature is kept below 75° F., and preferably at about 70° F. Copper is deposited from this bath at a rate of 0.008 inch per hour. Nickel can also be applied by electroless plating from previously known plating baths. A suitable electroless nickel plating bath composition, in grams per liter of water, is as follows: nickel chloride, 30; sodium glycollate, 50; and sodium hypophosphite, 10. The preferred operating temperature for this bath is about 190° F. Nickel is deposited under these conditions at a rate of 0.006 inch per hour. This step is readily carried out by passing the cable through a tank containing the plating bath, a contact time of 2 to 3 minutes being sufficient in most cases.

The electroless-plated cable is then covered with an electrolytically deposited plating. In this step the cable is rendered cathodic by electrical contact with one electrode of an electrolytic plating apparatus so that a potential is developed between the cable and an electrolytic plating bath containing the desired metal in solution, the plating bath being in contact with one or more anodes to which direct current is supplied. For electroplating of copper fluoborate solution or a copper pyrophosphate-ammonia solution of the following composition, in grams per liter of water, can be used: Cu, 18.5 to 30.0; $P_2O_7$, 130 to 210; and $NH_3$, 1.5 to 3.0. Preferred operating conditions are a temperature of 110 to 140° F., a cathode current density of 10 to 70 amperes per square foot, an anode current density of 20 to 100 amperes per square foot, and a tank voltage of 2 to 5 volts. Copper is deposited at a rate of approximately 0.0001 inch per 2.1 minutes at a current density of 50 amperes per square foot and at 100 percent efficiency. In general a contact time of 4 to 8 minutes is required to deposit a copper plating 0.0002 to 0.0004 inch thick.

For electroplating of nickel a solution containing the following components, in ounces per gallon of water, can be employed: nickel sulfamate, 60; boric acid, 4.0; antipitting agent, 0.05. Preferred operating conditions for plating with this bath include a temperature of 100 to 140° F. and a current density of 150 to 300 amperes per square foot, with the higher current densities corresponding to the higher temperatures. For chromium plating a preferred solution composition, in ounces per gallon of water, is as follows: chromic acid, 53; fluosilicate, 0.8; and sulfate, 0.13. For plating with this bath a temperature from room temperature to 95° F., a voltage from 6 to 12 and a current density from 50 to 700 amperes per square foot can be used.

Electroplating can be carried out as a continuous process by passing the cable over an electrode having a sliding electric contact or shoe and through a tank containing the electroplating solution. Application of the electrolytic plating can also be carried out by using two or more electroplating steps. Where the same current density is suitable for both steps the cable can be passed from one tank to the succeeding tank without any electrical separation.

In order to avoid contamination the cable should be washed by means of a water spray or the like between each of the process steps. This can be accomplished in a continuous process by passing the cable through a spray-rinse tank.

The metal layer 15 is in turn covered with top and bottom layers 16 and 17 of insulating material to prevent short circuiting. The insulating material for these layers can be the same as for inner layers 13 and 14. A thickness of 0.001 to 0.002 inch is sufficient for the outer layers in most cases, although thicker layers can be used. The outer layers can be applied by lamination by the procedure used for making the unshielded cable, with an adhesive being applied to the insulating film to produce an effective bond. The layers can also be applied by passing the cable through a solution or liquid form of a polymer such as a polyimide, and particularly poly[N-(4, 4'-diphenylether)4,4' carbonylidiphthalimide], so that the liquid adheres to the cable and then drying or curing the polymer by heating. The technique known as "tower coating" wherein the cable is exposed to the required heat while being passed up a tower-like structure can be used for this purpose. A temperature of 400 to 800° F. is required for the polyimide given above.

The embodiment shown in FIG. 1 and FIG. 2 has an extended edge portion 18 formed by lamination of the overlapping edges of outer sheets 16 and 17. This portion can be cut off by slitting or the like to reduce the width of the cable.

Figure 3:
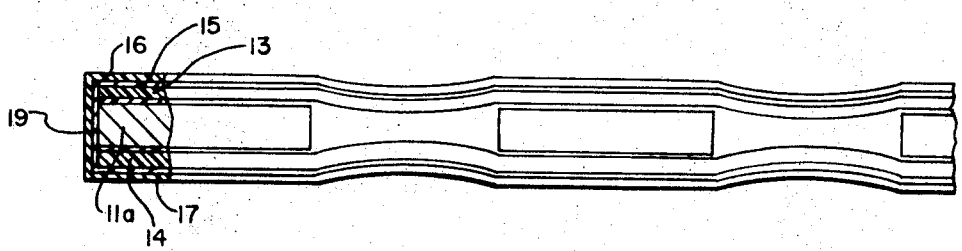
FIG. 3 is a fragmentary end view, partially in section, of a shielded flat cable having an outer insulating layer applied by an alternate coating method.

FIG. 3 depicts an embodiment which is the same as that shown in FIG. 2 except that the outer layers 16 and 17 are applied by tower coating rather than by lamination. In this embodiment a thin outer layer 19 of insulation at the edge of the cable conforms to the geometry of shielding layer 15.

Figure 4:
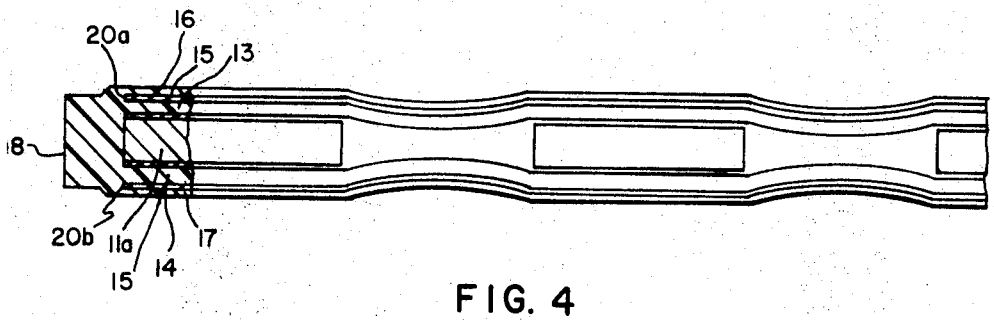
FIG. 4 is a fragmentary end view, partially in section, of a shielded flat cable having an open-edged shield fully separated from all conductors.

FIG. 4 shows an embodiment wherein the shielding layer 15 is open at the edge of the cable and not in contact with the outermost conductor. For this embodiment the shielded cable is prepared in the manner described above, except that after application of shielding layer 15 the cable is cut longitudinally along its edge to remove the portion of the shielding layer 15 which is in contact with the outermost conductor 11a. Cutting the shielding layer exposes top and bottom edges 20a and 20b, respectively, which are kept spaced apart from conductor 11a by insulating layer 13 and 14, respectively. Outer layers 16 and 17 are applied over the shielding layer, and end portion 18 formed by the laminated edges thereof covers the exposed edge of conductor 11a and edges 20a and 20b of the shielding layer. This embodiment can be used where an ungrounded shield having an open portion along the length of the cable is desired.

Figure 5:
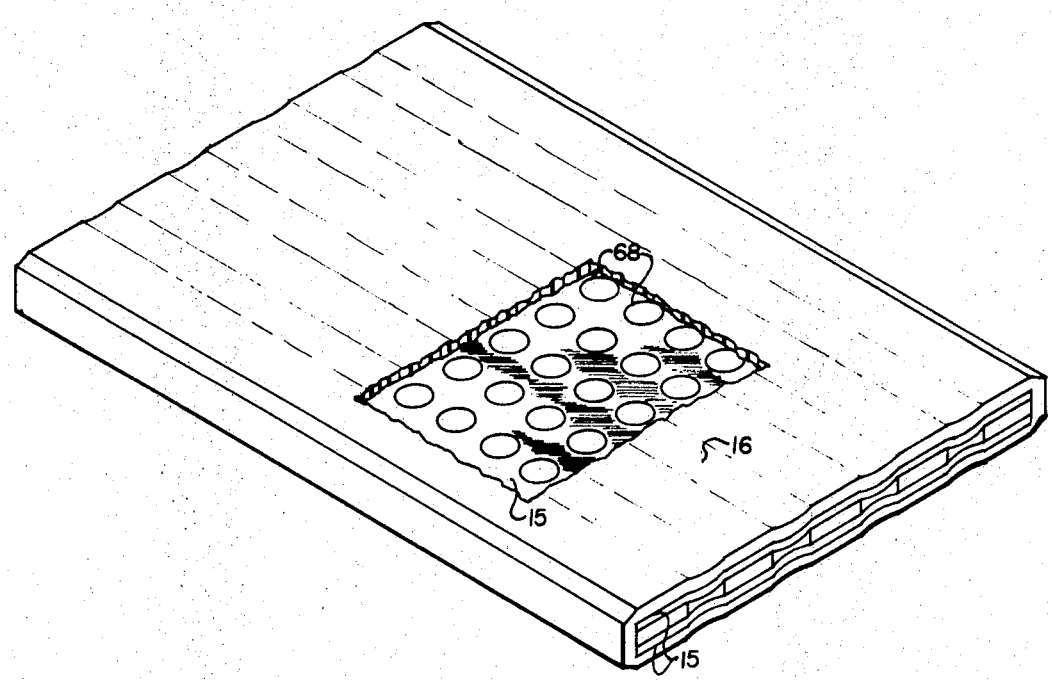
FIG. 5 is an isometric view, partially broken away, of a shielded flat cable having a perforated shield

FIG. 5 shows an embodiment which is the same as that shown in FIG. 1 except that the shielding layer 15 is penetrated by a plurality of openings 68. The openings can be obtained by printing the desired pattern on the shielding layer 15 with conventional photoresist material and etching to remove the metal. Openings up to 0.050 inch in diameter can be provided without detriment to shielding characteristics. Cable flexibility is increased and weight is decreased by the presence of openings in the shielding layer. The openings also provide for release of any gas evolved during heating steps used to cure the polymeric insulation material.

Figure 6:
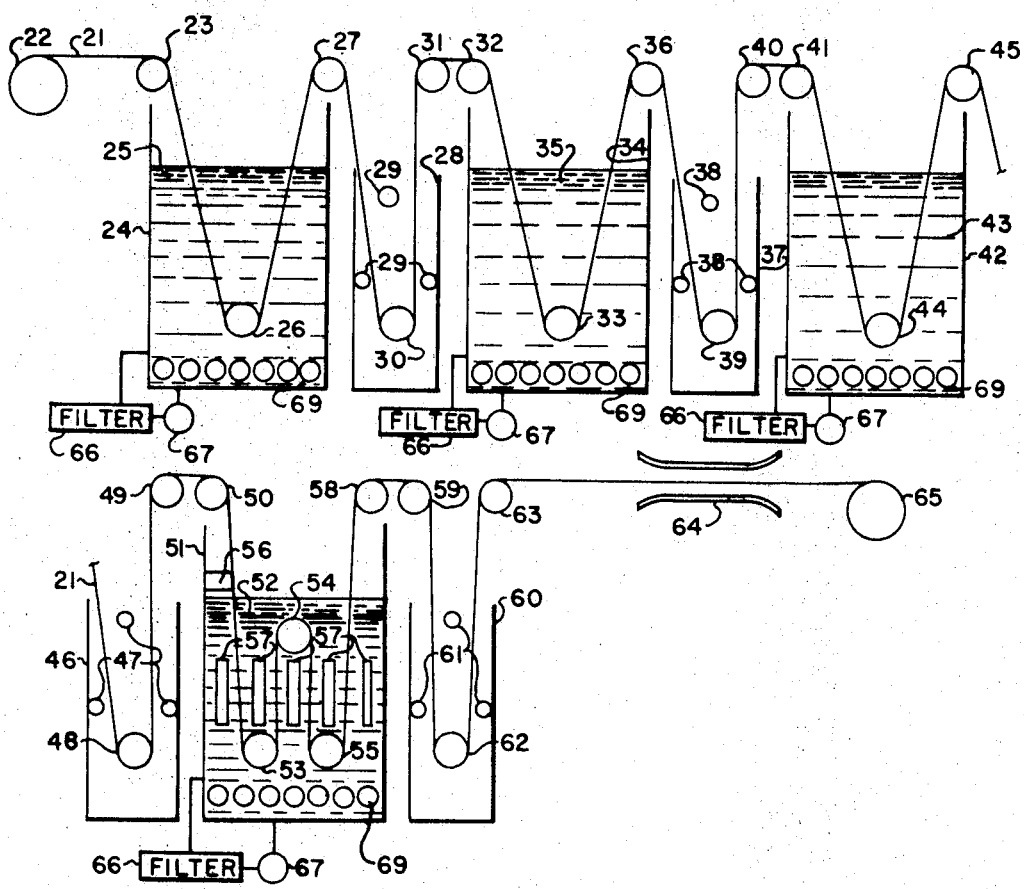
FIG. 6 is a schematic view of apparatus for applying a layer of shielding metal to flat cable by a continuous process.

FIG. 6 is a schematic drawing showing apparatus for applying the shielding layer 15 by a continuous process. A long segment of unshielded flat cable 21 wound on storage reel 22 is guided by roller 23 to a position over etching tank 24 containing a liquid etchant or surface roughening agent 25. The cable passes under roller 26 within the tank and over roller 27 above the tank. The cable is then directed into a water spray rinsing tank 28 having a plurality of spray heads 29 for ejection of water, the cable passing under roller 30 in the tank 28 and over roller 31 above the tank. Rollers 32 and 33 direct the cable downward into a tank 34 containing a wetting solution 35. The cable passes under roller 33 in tank 34, over a roller 36 above tank 34 and into a second spray tank 37 having spray heads 38. Roller 39 in tank 37 and roller 40 direct the cable through tank 37. The cable then passes over roller 41 and downward into tank 42 containing an electroless plating solution 43. Roller 44 in tank 42 and roller 45 above tank 42 direct the cable through the electroless plating solution 43. Spray tank 46 is provided for washing the electroless plated cable, water being ejected from spray heads 47 as the cable 21 passes under roller 48 in tank 46 and over roller 49 above this tank. An electrolytic plating is then applied by passing the cable over roller 50 and into tank 51 containing a suitable electroplating solution 52, the desired contact with the solution being obtained by passing the cable under roller 53 in and near the bottom of the tank 51, over roller 54 at a higher location in tank 51 and under roller 55 near the bottom. Electrical contact with the cable 21 is produced by electrode 56 mounted above the liquid level so that the cable is in sliding contact therewith as it enters tank 51. A plurality of electrodes 57 are disposed within the plating solution 52 and connected to a suitable source of direct current (not shown) as required for electroplating operation. The plated cable is passed over rollers 58 and 59 over tank 51 and through spray tank 60 having spray heads 61, rollers 62 in tank 60 and 63 over tank 60 guiding the cable. Finally, the cable is dried by passage in close proximity to an infrared heater 64 and is wound up on roller 65. Each of the treatment tanks is provided with a filter 66, pump 67 and heating means 69. The shielded cable can then be covered with a layer of insulating material by conventional lamination or coating techniques.

In addition to shield flat conductor cable prepared as described above, this invention includes the application of an electroless and electrolytically deposited layer of shielding metal to other types of cable and to other electrical components or assemblies having conductors embedded within and encased by insulating material. Conventional round conductor cable or cable of relatively flat cross section having round conductors embedded therein can be shielded by this means. Printed circuit boards and flexible harness having printed-circuit type conductors embedded in a flat strip of insulating material can be entirely encased by the shielding metal, or selected conductors can be masked off prior to application of the electroless and electrolytic platings.

Although preferred embodiments of the present invention are shown and described herein, it is to be understood that various changes and modifications can be made without departing from the scope of the invention, which is limited only as indicated by the appended claims.

What is claimed is:
1. The method of making flat conductor cable which comprises laminating two sheets of flexible insulating plastic having disposed therebetween an insulating adhesive and a plurality of elongated, thin, flat copper conductors in parallel, edge-to-edge, spaced-apart relationship, whereby said conductors are encased by said insulating plastic, treating the resulting laminated flat cable with an etchant whereby the surface thereof is roughened, contacting the roughened surface with a wetting agent, removing the insulating plastic from the edge of at least one of the outermost of said conductors along the length thereof so as to expose the surface of said edge, contacting the resulting treated cable with an electroless plating bath containing values of a metal selected from the group consisting of copper and nickel whereby an electroless metal plating is deposited thereon, electrolytically plating the resulting electroless plated surface with a shielding metal selected from the group consisting of copper, nickel and chromium and applying an outer layer of insulating plastic onto the resulting electrolytically plated surface.

2. The method of claim 1 including the step of forming a plurality of perforations in the electroless and electrolytically deposited metal layer prior to applying said outer layer of insulating plastic.

3. The method of claim 1 wherein said outer layer of insulating plastic is applied by laminating sheets of insulating plastic enclosing the shielded cable.

4. The method of claim 1 wherein said insulating plastic is selected from the group consisting of polyethylene terephthalate, polyimides, a copolymer of tetrafluorethylene and hexafluoropropylene, polytetrafluoroethylene, silicones, polyethylene and polyvinyl chloride.

5. The method of making flat conductor cable which comprises laminating two sheets of flexible insulating plastic having disposed therebetween an insulating adhesive and a plurality of elongated thin, flat, copper conductors in parallel, edge-to-edge, spaced-apart relationship, whereby said conductors are encased by said insulating plastic, treating the resulting laminated flat cable with an etchant whereby the surface thereof is roughened, contacting the roughened surface with a wetting agent, contacting the resulting wetted surface with an electroless plating bath containing values of a metal selected from the group consisting of copper and nickel whereby an electroless metal plating is deposited thereon, electrolytically plating the resulting electroless plated surface with a shielding metal selected from the group consisting of copper, nickel and chromium, removing a portion of the electroless and electrolytically deposited layer at at least one edge of the cable along the length of the cable so as to form a longitudinal gap in said layer and applying an outer layer of insulating plastic onto the resulting electrolytically plated surface.

6. The method of claim 5 including the step of forming a plurality of perforations in the electroless and electrolytically deposited layer prior to applying the outer layer of insulating plastic.

7. The method of making flat conductor cable which comprises laminating two sheets of flexible insulating plastic having disposed therebetween an insulating adhesive and a plurality of elongated, thin, flat copper conductors in parallel, edge-to-edge, spaced-apart relationship whereby said conductors are encased by said insulating plastic, treating the resulting laminated flat cable with an etchant whereby the surface thereof is roughened, contacting the roughened surface with a wetting agent, contacting the resulting wetted surface with an electroless plating bath containing values of a metal selected from the group consisting of copper and nickel whereby an electroless metal plating is deposited thereon, electrolytically plating the resulting electroless plated surface with a shielding metal selected from the group consisting of copper, nickel and chromium, coating the resulting electroplated surface with a curable liquid polymer and curing said polymer.

References Cited
UNITED STATES PATENTS

| | | | |
|---|---|---|---|
| 2,802,897 | 8/1957 | Hurd et al. | 174—110 |
| 3,004,229 | 10/1961 | Stearns | 174—117.5X |
| 3,033,703 | 5/1962 | Schneble et al. | 117—47 |
| 3,304,214 | 2/1967 | Alm | 174—110X |
| 3,317,330 | 5/1967 | Livingston et al. | 106—287 |
| 3,347,703 | 10/1967 | Engelman et al. | 117—215X |
| 3,429,788 | 2/1969 | Parstorfer | 204—16X |
| 3,434,867 | 3/1969 | Rousselot | 117—47 |
| 3,436,233 | 4/1969 | Jackson | 117—47X |

OTHER REFERENCES

"Popular Electronics," October 1957, vol. 7, No. 4, p. 22.

HOWARD S. WILLIAMS, Primary Examiner

W. I. SOLOMON, Assistant Examiner

U.S. Cl. X.R.

174—117.1